United States Patent [19]
Soloveychik et al.

[11] Patent Number: 5,801,849
[45] Date of Patent: Sep. 1, 1998

[54] IMAGE READING DEVICE AND DOCUMENT SCANNING SYSTEM

[75] Inventors: Yakov G. Soloveychik, Palo Alto; Alexander I. Gilevich, Sunnyvale; Bryan E. Loucks, Los Altos, all of Calif.

[73] Assignee: TeleSensory Corporation, Sunnyvale, Calif.

[21] Appl. No.: 734,801

[22] Filed: Oct. 21, 1996

[51] Int. Cl.$^6$ ..................................................... G03G 21/00
[52] U.S. Cl. ............................. 358/474; 355/25; 399/1; 399/218; 399/362
[58] Field of Search ........................... 399/1, 2, 108, 399/211, 218, 220, 362; 355/25; 358/473, 474, 505

[56] References Cited

U.S. PATENT DOCUMENTS

| | | |
|---|---|---|
| Re. 29,067 | 12/1976 | Watson . |
| 3,726,589 | 4/1973 | DiFulvio et al. . |
| 3,867,569 | 2/1975 | Watson . |
| 4,068,950 | 1/1978 | Kito . |
| 4,077,714 | 3/1978 | Komori et al. . |
| 4,143,960 | 3/1979 | Tracy . |
| 4,189,225 | 2/1980 | Nishikawa . |
| 4,321,502 | 3/1982 | Hammer et al. . |
| 4,402,572 | 9/1983 | Tsunoda et al. . |
| 4,415,255 | 11/1983 | Huber et al. . |
| 4,427,998 | 1/1984 | Huntoon . |
| 4,500,197 | 2/1985 | Dannatt . |
| 4,538,185 | 8/1985 | Wiggins . |
| 4,547,813 | 10/1985 | McGraw et al. . |
| 4,553,148 | 11/1985 | Behrens et al. . |
| 4,585,334 | 4/1986 | Malyon . |
| 4,587,418 | 5/1986 | Shirakoshi et al. . |
| 4,623,247 | 11/1986 | Wilman . |
| 4,630,123 | 12/1986 | Kadomatsu . |
| 4,644,159 | 2/1987 | Miura . |
| 4,682,042 | 7/1987 | Igarashi . |

(List continued on next page.)

FOREIGN PATENT DOCUMENTS

| | | |
|---|---|---|
| 0712233 | 5/1996 | European Pat. Off. . |
| 3428325 | 8/1985 | Germany . |
| 3546404 | 7/1987 | Germany . |
| 7-135540 | 5/1995 | Japan . |
| 2220759 | 1/1990 | United Kingdom . |

OTHER PUBLICATIONS

V. Agarwal, "Book Copying Apparatus", Xerox Disclosure Journal, vol. 9, No. 6, Nov./Dec. 1984, p. 383.

J. Guenther, "Library Copier", Xerox Disclosure Journal, vol. 12, No. 5, Sep./Oct. 1987, pp. 231–232.

D. Thompson, et al., "Bent Fluorescent Lamp for Bookedge Scanning", Xerox Disclosure Journal, vol. 16, No. 4, Jul./Aug. 1991, pp. 213–214.

L. Atkinson III, et al., "An Old Technology, Gradient Index Lenses, Finds New Applications", *The Photonics Design and Applications Handbook*, 1996, pp. H362–H367.

*Primary Examiner*—Nestor R. Ramirez
*Attorney, Agent, or Firm*—Majestic, Parsons, Siebert & Hsue

[57] ABSTRACT

The document scanner of the present invention includes a reading assembly of simple, compact and light-weight construction. The reading assembly includes an optical system having a relatively short focal length. The reading assembly is thus simply configured in a compact manner close to the document to be scanned. The optical system is also configured to extend in a particular direction beyond the document viewing area for improved resolution of images from a bound document adjacent the binding. The reading assembly further includes a compact and light-weight illumination source which is low in power consumption, and thus, may be powered by batteries. The stand-alone document scanner of the present invention is particularly suited to portability.

20 Claims, 3 Drawing Sheets

U.S. PATENT DOCUMENTS

| | | |
|---|---|---|
| 4,716,300 | 12/1987 | Andrich et al. . |
| 4,754,485 | 6/1988 | Klatt . |
| 4,793,812 | 12/1988 | Sussman et al. . |
| 4,812,917 | 3/1989 | Suzuki . |
| 4,839,514 | 6/1989 | Mine et al. . |
| 4,845,570 | 7/1989 | Uchiyama . |
| 4,851,927 | 7/1989 | Moriya . |
| 4,926,041 | 5/1990 | Boyd . |
| 4,933,753 | 6/1990 | Watanabe . |
| 4,982,222 | 1/1991 | Rees . |
| 4,994,877 | 2/1991 | Ino et al. . |
| 5,012,275 | 4/1991 | Bock . |
| 5,041,762 | 8/1991 | Hartai . |
| 5,051,802 | 9/1991 | Frost et al. . |
| 5,053,819 | 10/1991 | Malyon et al. . |
| 5,072,252 | 12/1991 | Howseman, Jr. . |
| 5,095,336 | 3/1992 | Corona et al. . |
| 5,138,223 | 8/1992 | Osada et al. . |
| 5,182,445 | 1/1993 | Yamashita . |
| 5,221,839 | 6/1993 | Braun . |
| 5,270,840 | 12/1993 | Ogata et al. . |
| 5,359,207 | 10/1994 | Turner . |
| 5,426,302 | 6/1995 | Marchman et al. . |
| 5,426,533 | 6/1995 | Wallace . |
| 5,475,505 | 12/1995 | Minasian et al. . |
| 5,489,995 | 2/1996 | Iso et al. ................... 358/474 |
| 5,523,575 | 6/1996 | Machida et al. . |
| 5,523,876 | 6/1996 | Tellam et al. ................ 359/196 |

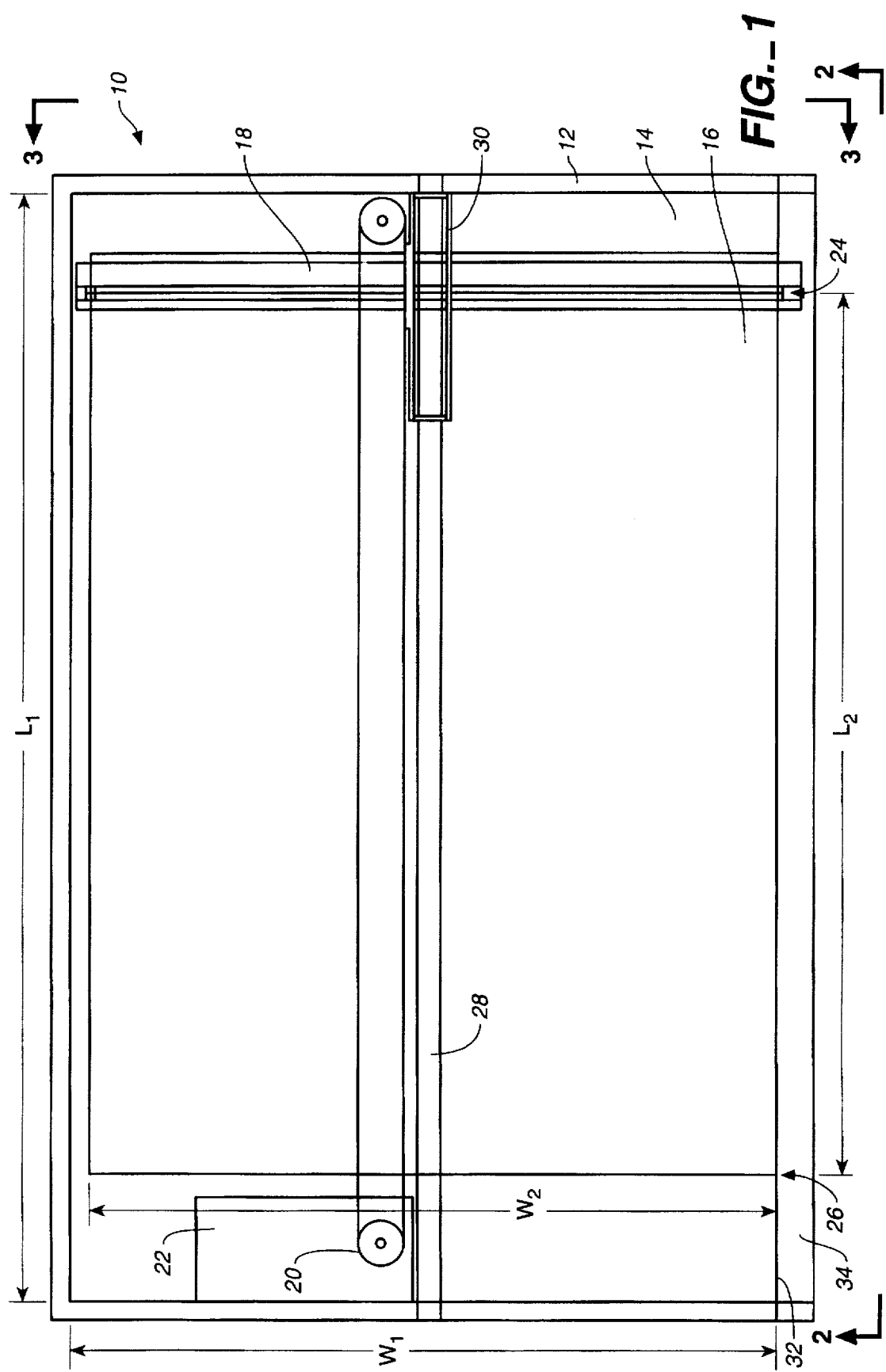

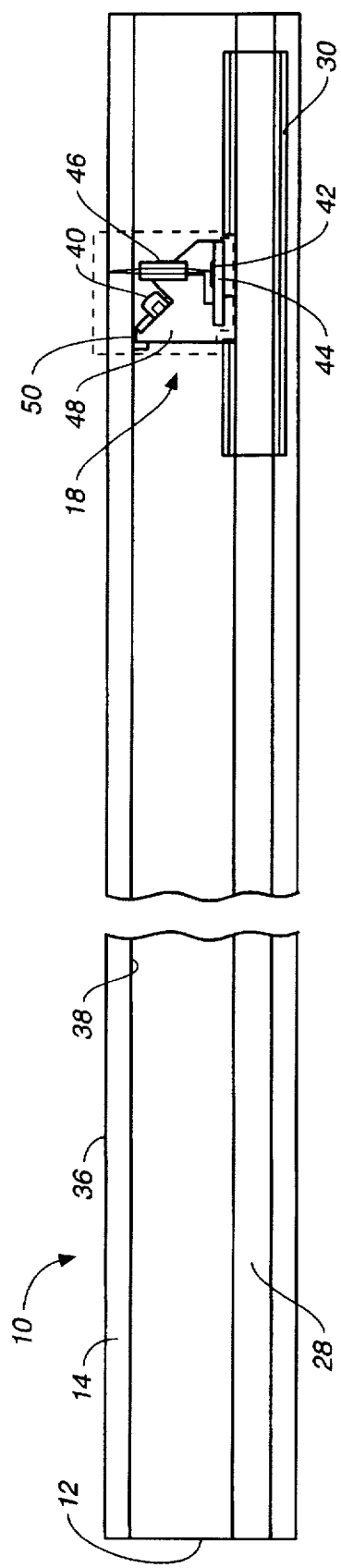
FIG._2
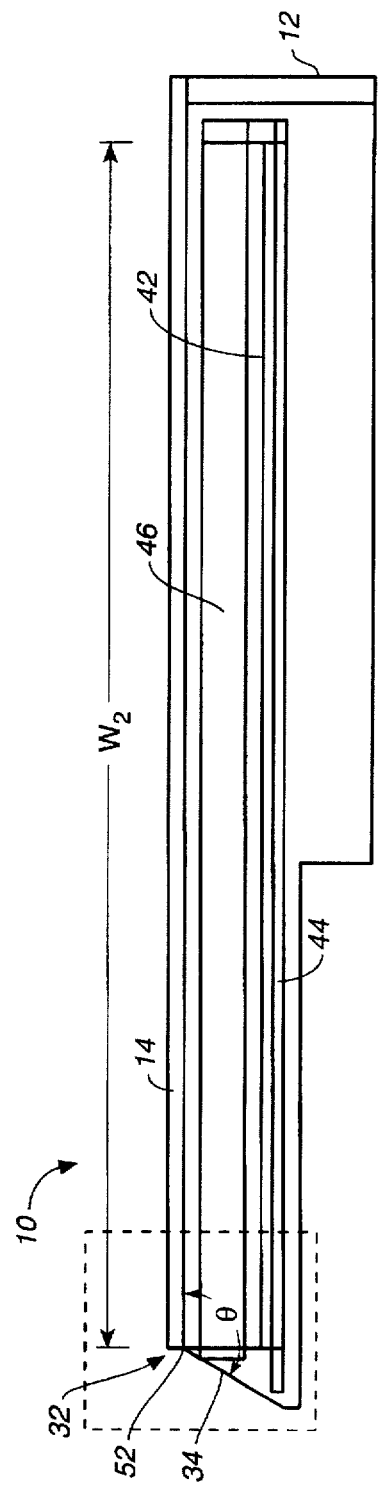
FIG._3

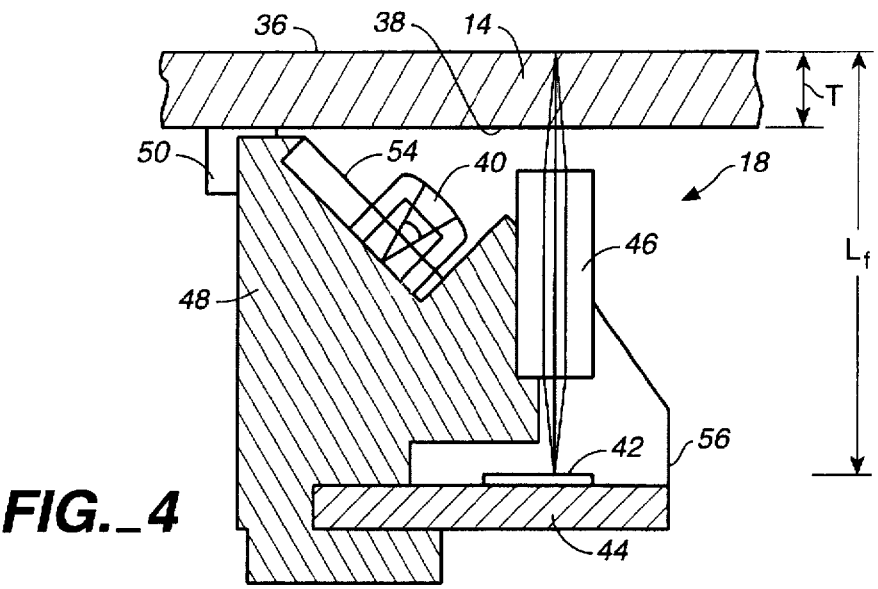
FIG._4
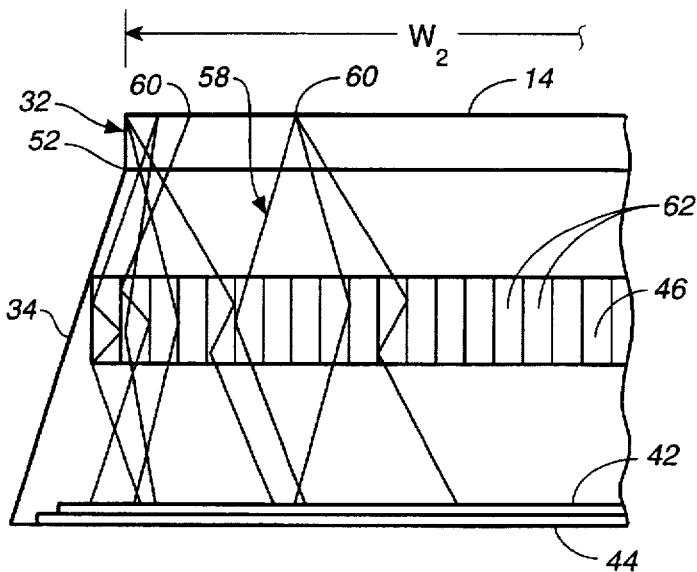
FIG._5
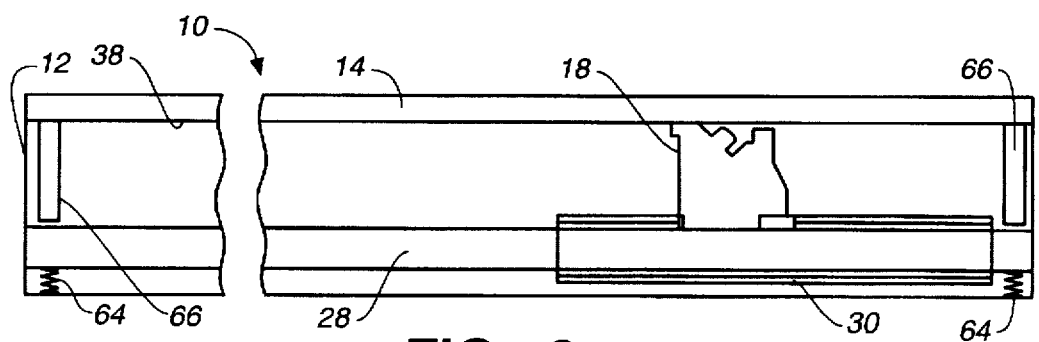
FIG._6

IMAGE READING DEVICE AND DOCUMENT SCANNING SYSTEM

BACKGROUND OF THE INVENTION

This invention relates generally to a device used to read an image and a system used to scan an image which incorporates such an image reading device, and methods of using same. More particularly, the present invention relates to an image reading device uniquely constructed for advantageous use in a portable image scanning system.

Image readers have been used as elements in a variety of environments, such as in facsimile copiers, automated teller machines, image scanners and optical character recognition systems. An optical image reader is conventionally constructed as an enclosed structure whose internal elements, such as a light source, a rod lens and a light-receiving element, are enclosed in an internal space which is formed by a housing, a support plate and a platen which serves as a window to the image source.

Conventionally constructed image readers have several significant disadvantages. By way of example, image readers which enclose contact image sensors (CISs) are often difficult to manufacture, as they have parts of complex shape which must be produced by injection molding. Further disadvantages are associated with the use of such enclosed image readers in connection with bound image sources, such as books. For example, the enclosure of these image readers prevents the internal optical system from extending all the way to the end of the platen or window, making it difficult to read a bound image source close to its binding adjacent the platen edge.

Further, in many image scanning applications, the image source, such as a sheet of paper, is moved across the stationary platen of the image reader enclosure during scanning. Such a system is not practical for use in scanning bound image sources, such as books, as the physical configuration of bound image sources generally interferes with movement of the pages thereof across a stationary platen. Thus, the image is usually copied from the bound image source before scanning. This is not only inconvenient, but also disadvantageous in that the copied image is often curved in the area corresponding to the area of the image adjacent to the binding of the image source. Upon subsequent scanning, it is often the case that the curved image copy cannot be resolved by the optical system of the image reader.

In other image scanning applications, such as the use of hand-held scanners, the window of the enclosed image reader is manually moved across the stationary image during scanning. Some of these hand-held scanners have been adapted for use by blind or visually impaired persons in connection with a reading machine with character recognition and voice synthesizing capabilities. However, practically speaking, it is not easy for a blind or visually impaired person to move a hand-held scanner in relation to an image that he or she may not be able to see or to see clearly. Additionally, as compared to sighted persons who have come to rely more and more on sight-based electronic information systems, such as conventional computers, blind or visually impaired persons rely heavily on books. The enclosure of conventionally constructed image readers used in these hand-held scanners prevents the internal optical system from extending all the way to the end of the scanning window, making it difficult to scan books close to their bindings.

Image scanning systems have been developed for scanning an image from a bound document. The existing image scanners designed for this purpose employ charge coupled device (CCD) flat-bed scanner technology which provides high image resolution. Using this technology, a line image having the length of a standard page, for example 8½ inches, is focussed by way of an optical system over a focal length of 10 to 20 inches onto a remote image sensor or CCD sensor. Because of the long optical path, the image must be highly illuminated for sufficient resolution at the remote image sensor. Additionally, in order to make the long optical length more manageable, the optical path is typically "folded" within the system enclosure by way of complicated optical configurations of mirrors and lenses. Systems such these are thus power-consuming, heavy, cumbersome and expensive.

There remains a need for an image reader appropriately constructed for reading an image from a bound image source. Additionally, there remains a need for an image scanning system appropriate for scanning an image from a bound image source, which is compact and light-weight and has low power requirements. More particularly, there is a need for a truly portable image scanning system.

SUMMARY OF THE INVENTION

These needs are met by the various aspects of the present invention that provide a document scanner, an optical reading assembly therein and methods of using them, all with a reduced size, reduced weight, reduced power consumption and a resulting high degree of portability.

According to one aspect of the present invention, a document scanner of the type having a stationary transparent platen utilizes a form of a contact image sensor (CIS) as a reading assembly that is scanned across an underside of the platen to read a document positioned on the platen. That is, the reading assembly includes a source of light, an array of photodetectors and an optical system imaging the document onto the photodetector array, all of which are elongated in a direction across the width of the platen and are held together to be moved along the length of the platen to scan the document. But rather than being enclosed, as is the case with prior CISs that directly contact the document being scanned, at least the light source and optics are opened to face the platen's underside without a transparent window or other enclosing structure therebetween.

A significant advantage of using this modified form of CIS in a document scanner is its much smaller size and weight as compared to the large folded optical system, normally used in fixed platen scanners, that involve many individual optical elements. Additionally, since the photodetector array preferably employs conventional silicon photodetector elements of high sensitivity and is positioned in close proximity to the document being scanned, less document illumination brightness is required than when remote image sensors (RISs) of prior fixed platen scanners with optical systems of long focal range are used. A light emitting diode (LED) then becomes a practical document illuminating source. These improvements all contribute to reducing the power consumption of the scanner. The smaller size, lighter weight and reduced electrical power needs make practical a portable scanning unit.

According to a more specific aspect of the present invention, the document supporting top platen surface is maintained in focus on the photodetector by urging the reading assembly of the type described above against the underside of the platen, usually a piece of glass of uniform thickness, during scanning. This results in the elongated lens system being maintained at a uniform, correct distance from the document being scanned. In a specific implementation, platen-contacting bearing surfaces are provided on the top of the reading assembly, and either the reading assembly or its driving system are resiliently urged upward. Optionally, the reading assembly bearing surfaces may be made adjustable with respect to the lens system in order to allow the individual scanners to be manually focused as part of the manufacturing process.

According to another aspect of the present invention, such a scanner may be used to image full pages of books by extending at least the elongated optical system of the reading assembly a distance beyond an edge of the platen. This allows scanning a page of a book close to its binding with full image brightness when the binding is positioned adjacent the platen edge. In a specific implementation, the extended optics are covered by a canted side wall of the scanner, over which the page of a book opposite to the page being scanned will normally extend.

Additional features and advantages of the present invention are given in the following description of a preferred embodiment thereof, which description should be taken in conjunction with the accompanying drawings.

BRIEF DESCRIPTION OF THE DRAWINGS

FIG. 1 is a top plan view of a scanner according to the present invention.

FIG. 2 is an abbreviated, side view of the scanner of FIG. 1 along lines 2—2, in which a reading assembly and a portion of a document support are outlined by dashed lines.

FIG. 3 is a side view of the scanner of FIG. 1 along lines 3—3, in which a portion of the scanner is outlined by dashed lines.

FIG. 4 is an exploded side view of the reading assembly and document support portion as outlined in FIG. 2.

FIG. 5 is a schematic illustration of an exploded side view of the portion of the scanner as outlined in FIG. 3.

FIG. 6 is an abbreviated, side view of the scanner of FIG. 1 along lines 2—2, showing the scanner according to an embodiment of the present invention.

DESCRIPTION OF A PREFERRED EMBODIMENT

The document scanner of the present invention is designed and constructed to be compact, light-weight and low in power consumption. By way of example, the document scanner has a simple and compact optical system and a low-power illumination system which may be, and preferably is, powered by light-weight batteries. The document scanner is thus ideal for portable use, enabling the user to transport the light-weight, portable document scanner to any use location, such as a library, for any document scanning and reading application, such as scanning and reading books at the library. Once the document image is scanned and read into the document scanner, it is electronically converted to a desired form of output, for example, stored electronic memory, speech output or the like, in ways known in the art.

The document scanner of the present invention is hereafter described in relation to FIG. 1 through FIG. 6, in which like features and elements are referenced by common reference numerals, unless otherwise indicated.

A document scanner according to the present invention is illustrated in FIG. 1. Particularly, as shown, the scanner 10 has a scanner housing 12 which supports an optically transparent window 14, typically made of glass. As detailed in FIG. 2, the window 14 has an upper surface 36 for supporting a document (not shown) and a lower surface 38 positioned over a reading assembly 18.

In use, the window or platen 14 supports a document to be scanned while the reading assembly 18 within the housing 12 is moved beneath the window 14 so as to cover a particular document viewing area 16. AS shown in FIG. 1, the window 14 is rectangularly shaped, having the dimensions of length $L_1$, and width $W_1$. Preferably, these dimensions are chosen in accordance with a range of typical sizes of documents to be scanned, as well as portability considerations. These window dimensions are typically greater than that of a document viewing area 16, having the dimensions of length $L_2$ and width $W_2$, as shown.

The reading assembly 18 is an elongated structure which extends across the width $W_2$ of the viewing area 16. During scanning, this elongated reading assembly 18 is moved beneath the window 14 along the length $L_2$ of the viewing area 16. In this manner, when a document is placed on the window 16, the area of the document corresponding to the viewing area 16 is scanned and read.

Movement of the reading assembly is accomplished by moving means, which may include a conventional pulley system 20 and a conventional motor 22 for driving the pulley. The pulley system 20 is operably connected to a carriage 30 which carries reading assembly 18. The carriage 30 is slidably mounted on a elongated rod 28 having a length parallel to the window length $L_1$. Thus, when the pulley system 20 is driven by the motor 22, it moves the carriage 30 along the rod 28, thereby moving the reading assembly beneath the window 14 from a position 24 to a position 26 (which may be arbitrarily referred to as a starting position and an ending position, respectively) to cover the entire viewing area 16.

According to a particular embodiment, the scanner is adapted for use with a bound image source or document, for example, a book, magazine or the like. (The bound document may be generally referred to as a book herein, merely for convenience.) In this embodiment, as clearly shown in FIG. 3, the window 14 has an edge 32 and the housing has a side surface 34 which extends in an outward direction from the window 14 and in a downward direction from the window edge 32. An obtuse angle θ is thus formed between the window 14 and the side surface 34, where the vertex of angle θ is the window edge 32. In use, a page of the book (not shown) selected for scanning is placed on the window 16 so that the edge of the page closest to the book binding is adjacent the window edge 32. In this manner, the full book page is ideally positioned on the window for scanning and reading, as further described in relation to FIG. 3 herein.

The document scanner 10 of FIG. 1 is further illustrated in longitudinal cross-section in FIG. 2. As shown, the reading assembly 18 is situated between the rod 28 and the lower surface 38 of the window 14. The configuration of the reading assembly 18 with respect to the window 14, as well as particular elements of the reading assembly, are clearly shown in the exploded illustration of FIG. 4.

As shown in FIG. 4, the reading assembly 18 includes a light source 40, a photodetector structure 42 and an optical system 46. The light source 40, the photodetector structure 42 and the optical system 46 are elongated in a direction parallel to the window width $W_1$ shown in FIG. 1, to allow for document reading along the viewing area width $W_2$.

The light source 40 of the reading assembly is positioned appropriately for illumination of a document held against the upper surface 36 of window 14 through that transparent window. Preferably, the elongated light source 40 has a length at least equal to the viewing area width $W_2$. The light source may be mounted on a substrate 54, as shown. Preferably, the light source 40 includes a light emitting diode (LED). More preferably, the light source 40 includes a linear array of LEDs, mounted on a LED board which is elongated in a direction parallel to the window width $W_1$. Thus, light sources suitable for use in the present invention are compact, light-weight and low in power consumption.

The optical system 46 of the reading assembly is a simple configuration, as shown. The optical system 46 is positioned appropriately for imaging onto the photodetector structure 42 an area of the document within the viewing area 16. For this purpose, the elongated optical system 46 has a length in excess of the viewing area width $W_2$, as shown in FIG. 3 and further described in relation to FIG. 5. Preferably, the optical system 46 includes a gradient index lens structure. More preferably, the optical system 46 includes a radial gradient index lens, commonly known as a SELFOC rod lens manufactured by Nippon Sheet Glass, which are most preferably arranged in a linear array, as detailed in FIG. 5. Gradient index lenses appropriate for use in the document scanner of the present invention are described in an article published in *The Photonics Design And Application Handbook* 1996 by Leland G. Atkinson, III and Douglas S. Kindred, entitled, *Gradient Index Optics: An Old Technology, Gradient Index Lenses, Finds New Applications*, which is incorporated herein in its entirety by this reference. The optical system 46 is thus a simple configuration of compact, light-weight lens structures.

The elongated photodetector structure 42 of the reading assembly, onto which an area of the document within the viewing area 16 is imaged, has a length which is at least equal to that of the viewing area width $W_2$, as shown in FIG. 3 and further described in relation to FIG. 5. Preferably, the photodetector structure 42 has a length equal to that of the optical system 46. More preferably, the photodetector structure 42 has a length in excess of that of the optical system 46. The photodetector structure 42 may be mounted on a substrate 44, which is elongated in a direction parallel to the window width $W_1$ and preferably has a length in excess of that of the photodetector structure. Preferably, the photodetector structure 42 includes a linear array of photodetectors along its length. More preferably, the photodetector structure 42 includes a linear array of silicon photodetectors mounted on a silicon substrate. The photodetector structure 42 is thus compact and light-weight.

The reading assembly 18 may further include an opaque light shield 56, as shown in FIG. 4, to shield the photodetector structure 42 from extraneous light from the surrounding environment. As shown, light shield 56 may be mounted on or attached to substrate 44 and be shaped so that a portion thereof lies adjacent the optical system 46, so that it blocks extraneous light external to the optical system.

As shown in FIG. 4, the reading assembly 18 also includes a frame 48, elongated in a direction parallel to the window width $W_1$, which holds the light source 40, photodetector 42 and optical system 46 in a spatially fixed relation relative to one another and in an open relationship to the lower surface 38 of the window 14. This frame 48 need not extend the full length of the reading assembly, but preferably does so extend. Preferably, this frame 48 is a single extruded piece of plastic material.

As the reading assembly frame 48 does not enclose the reading assembly, it does not interfere with document scanning adjacent window edge 32, as described above in relation to the scanning of bound documents. Further, the frame 48 is uncomplicated in shape, such that it is easily and economically manufactured as a single extruded piece. A frame suitable for the reading assembly of the present invention is both compact and light-weight.

As further shown in FIG. 4, the window 14 is planar, having a uniform thickness T between its upper surface 36 and lower surface 38. Directly beneath the lower surface 38 lies a bearing surface 50 which contacts and slides across the lower surface during the scanning movement of the reading assembly. As shown, the bearing surface 50 is carried by the frame 48 of the reading assembly 18. While only one bearing surface 38 has been shown in the cross-sectional illustration of FIG. 4, preferably at least two bearing surfaces are evenly spaced along the length of the reading assembly frame 48.

As the bearing surface 50 slides across the lower surface, it is composed of a slide-conducive material, for example, Teflon or a similar material. The surface may be shaped in a L-shape, as shown, or otherwise, for example, in the shape of a puck, disk, or rectangular surface. Further by way of example, the bearing surface 50 may be in the form of a screw or bolt fastened to the frame 48 which has a top surface composed of a slide-conducive material. Preferably, the bearing surface 50 is adjustable with respect to the reading assembly frame 48, to facilitate variable vertical positioning of the optical system 46 with respect to the upper surface 36 of the window 14. The adjustable bearing surface 50 thus accommodates windows of different thicknesses.

The vertical positioning of the optical system 46 relative to the upper surface 36 of the window 14 is selected in accordance with a focal length $L_f$ of the optical system 46. The focal length $L_f$ may alternately be expressed as the distance between the document held against the window 14 to be scanned and the photodetector structure 42. In the compact scanner of the present invention, the focal length $L_f$ of the optical system 46 is less than or equal to about one inch. The document is held against the window 14 and the bearing surface 50 is adjusted, as described above, to accommodate this compact focal length $L_f$.

Additionally, as shown in FIG. 6, the reading assembly 48 itself is urged toward the lower surface 38 of the window 14 to accommodate the compact focal length $L_f$. Particularly, the rod 28 on which the reading assembly carriage 30 travels, is urged in the direction of the window 14 by way of urging means. The urging means may include a resilient element 64, for example, a compression spring. As shown in FIG. 6, preferably at least two resilient elements are evenly spaced along the length of the rod 28.

The reading assembly 48 is thus urged toward the lower surface 38 of the window 14 with a force sufficient to bring the bearing surface 50 into contact with the lower surface 38. A spacer 66 is situated between the rod 28 and the lower surface 38. This spacer has a dimension extending between the rod and the lower surface which is sufficient to maintain a certain distance between the reading assembly 48 and the lower surface of the window 38. In this manner, the spacer 66 prevents any over-urging of the reading assembly 48 toward the lower surface 38 which might interfere with the sliding of the bearing surface 50 along the lower surface 38 or the movement of the reading assembly 48 relative to window 14.

A portion of the document scanner 10 is now described in relation to the schematic illustration of FIG. 5. In the portion shown, the optical system 46, which may include a linear array of adjacent gradient lenses 62, extends beyond the viewing area width $W_2$. As schematically shown, light (represented by light rays 58) is reflected from the document (not shown) held against the window 14, through the window 14 and to the optical system 46. As further shown, the light rays 58 generally travel from one of various points 60 of a document image in various directions toward the optical system 46. Some light rays thus travel beyond the viewing area width $W_2$ on their way to the optical system. Because the optical system 46 extends beyond the viewing area width $W_2$, it is able to direct these additional rays toward the photodetector structure 42 for detection. While the photodetector structure need not extend beyond the viewing area width $W_2$, as shown in FIG. 3, preferably it does so extend, as shown in FIG. 5, for better image resolution. The document scanner 10 thus provides improved image resolution.

The portion of the optical system 46 which extends beyond the viewing area width $W_2$ may be enclosed by planar surface 34, as further illustrated in FIG. 5. This embodiment is advantageous for scanning and reading images from bound image sources, as described above in relation to FIG. 3. By way of example, a particular advantage of this embodiment is the ability to read portions of the image adjacent the binding.

The document scanner of the present invention provides the advantages of simple, compact and light-weight construction, as well as low power consumption. These advantages render the stand-alone document scanner office-independent and ideally suited to portability. Additionally, the document scanner is advantageously used to scan and read bound documents with improved resolution of images adjacent the binding.

It is to be understood that while the invention has been described above with respect to a specific preferred embodiment, the description is intended to illustrate and not to limit the scope of the invention, which is defined by the scope of the appended claims.

It is claimed:

1. A scanner, comprising:

an optically transparent support adapted to receive a document against one side thereof within a viewing area extending in first and second directions thereacross, said first and second directions being orthogonal to each other, a reading assembly positioned on an opposite side of the document support and elongated to extend across the viewing area in the first direction, means for moving the reading assembly across the document support viewing area in the second direction, thereby to scan and read the entire viewing area, said reading assembly including:

a light source elongated in said first direction and positioned to illuminate through the document support a document held against said support one side, a photodetector structure that is elongated in the first direction with a length at least equal to that of a maximum extent of the viewing area in said first direction, and an optical system that is elongated in the first direction with a length in excess of the maximum extent of the viewing area in said first direction and positioned to image onto the photodetector an area of the document within the viewing area.

2. The scanner of claim 1, wherein the document support is planar and has a uniform thickness at least across the viewing area.

3. The scanner of claim 2, wherein the reading assembly additionally includes at least one surface carried thereby for contacting and sliding across the opposite side of the document support while being scanned across the viewing area, and wherein said means for moving the reading assembly includes means for urging the reading assembly against the opposite side of the document support, thereby to control a distance of elements of the reading assembly with respect to said one document support surface in its viewing area.

4. The scanner of claim 3, wherein said means for moving the reading assembly additionally includes a rod elongated in the second direction, and a carrier held to slide along the rod and attached to the reading assembly, and wherein the means for urging the reading assembly against the opposite side of the document support includes at least one resilient element positioned to urge the rod in a direction toward the document support.

5. The scanner of claim 2, wherein the viewing area extends to an edge of the document support that extends in said second direction, and the optical system extends outside of the viewing area beyond said edge, whereby the scanner is useful to scan a page of a bound document having its binding positioned along said edge.

6. The scanner of claim 5, which additionally comprises a planar surface extending from said document support edge outward of the viewing area and away from the opposite side of the document support in a manner to enclose the optical system extending outside of the viewing area.

7. The scanner of any one of claims 1-6, wherein the photodetector structure includes a linear array of photodetectors along the first direction.

8. The scanner of any one of claims 1-6, wherein the optical system has a focal length of equal to or less than about one inch.

9. The scanner of any one of claims 1-6, wherein the optical system includes a gradient index lens structure.

10. The scanner of any one of claims 1-6, wherein the reading assembly includes a frame elongated in the first direction and holding all of the light source, photodetector structure and optical system spatially fixed with respect to one another and in an open relationship to the opposite side of the document support.

11. The scanner of claim 10, wherein the reading assembly frame includes a single extruded piece extending a full length of the reading assembly.

12. The scanner of any one of claims 1-6, wherein the light source includes a light emitting diode.

13. A scanner for a page of a bound document, comprising:

a housing including (1) a rectangularly shaped platen that is optically transparent, is of uniform thickness and which forms an exposed top surface of the housing to receive a page of a bound document thereon adjacent one edge thereof, and (2) a side surface extending outward of the platen and downward from said platen one edge to form in cross section an obtuse angle with said platen one edge as a vertex thereof, an optical reading assembly within the housing that includes a frame having a length extending orthogonally to said one platen edge and that is moveable in a direction parallel with said one platen edge, the following elements being attached to said frame and opened to the platen: a bound document page illumination source, a photodetector and an optical system that images read portions of an illuminated page of a bound document onto the photodetector, each of which is elongated along the length of the frame, the optical system being extended beyond said one platen edge within the side housing surface, thereby allowing a bound document to be positioned with a binding thereof over said one platen edge in order to position a full page of the bound document on the platen in a manner to be read, bearing surfaces attached to a top of said optical reading assembly frame and contacting an underside of the platen to slide therealong when the reading assembly is moved, and a resilient system carried within the housing that urges the reading assembly upward to maintain the bearing surfaces in contact with an underside of the platen as the reading assembly is moved across the platen.

14. The scanner of claim 13, additionally comprising at least one rod held within the housing with a length thereof extending parallel with said one platen edge, a carrier that is slidable along the length of the rod and to which the reading assembly is attached, and a motor source connected to the carrier to move it along said at least one rod.

15. The scanner of claim 14 wherein said at least one rod is held in a manner to be moveable a distance with respect to the platen, and wherein said resilient system includes at least one resilient element urging the rod in a direction of the platen, thereby to hold said bearing surfaces against an underside of the platen as the reading assembly is moved across the platen.

16. The scanner of claim 13 wherein said bearing surfaces are adjustable with respect to the reading assembly frame, thereby allowing individual positioning of the optical system with respect to the platen top surface.

17. The scanner of any one of claims 13–16, wherein the photodetector includes a linear array of photodetectors extending along the length of the reading assembly frame.

18. The scanner of any one of claims 13–16, wherein the optical system has a focal length of equal to or less than about one inch.

19. The scanner of any one of claims 13–16, wherein the optical system includes a gradient index lens structure.

20. The scanner of any one of claims 13–16, wherein the light source includes a light emitting diode.

* * * * *